(12) United States Patent
Nguyen

(10) Patent No.: US 8,337,124 B2
(45) Date of Patent: Dec. 25, 2012

(54) HIGH SPEED HAND DRILL WITH SWIVELING PRESSURE FOOT AND INTEGRATED VACUUM PICKUP AND COOLANT DELIVERY DUCT

(75) Inventor: Peter D. Nguyen, Irvine, CA (US)

(73) Assignee: The Boeing Company, Chicago, IL (US)

(*) Notice: Subject to any disclaimer, the term of this patent is extended or adjusted under 35 U.S.C. 154(b) by 1197 days.

(21) Appl. No.: 12/035,175

(22) Filed: Feb. 21, 2008

(65) Prior Publication Data

US 2009/0214307 A1  Aug. 27, 2009

(51) Int. Cl.
  *B23B 47/34* (2006.01)
  *B23B 49/02* (2006.01)
  *B23B 51/06* (2006.01)

(52) U.S. Cl. ........... 408/1 R; 408/56; 408/67; 408/72 B; 408/97; 408/241 B

(58) Field of Classification Search ............ 408/56, 408/67, 72 B, 97, 241 B, 1 R; *B23B 47/34, B23B 49/02, 51/06*
See application file for complete search history.

(56) References Cited

U.S. PATENT DOCUMENTS

| | | | | |
|---|---|---|---|---|
| 994,430 A | * | 6/1911 | Tunks | 408/56 |
| 2,339,324 A | * | 1/1944 | Fischer | 408/56 |
| 4,209,069 A | * | 6/1980 | Smith | 173/75 |
| 4,588,334 A | * | 5/1986 | Khurana | 408/61 |
| 4,740,117 A | * | 4/1988 | Schaff Deleury et al. | 408/72 R |
| 4,764,060 A | * | 8/1988 | Khurana | 408/14 |
| 5,033,917 A | | 7/1991 | McGlasson et al. | |
| 5,203,855 A | * | 4/1993 | Givler et al. | 408/1 R |
| 5,213,454 A | * | 5/1993 | Givler et al. | 408/61 |
| 5,281,056 A | * | 1/1994 | Lawson et al. | 408/1 R |
| 5,356,245 A | * | 10/1994 | Hosoi et al. | 408/56 |
| 5,358,361 A | * | 10/1994 | Jurski | 408/67 |
| 5,395,187 A | * | 3/1995 | Slesinski et al. | 408/1 R |
| 5,482,411 A | * | 1/1996 | McGlasson | 408/1 R |
| 5,584,618 A | * | 12/1996 | Blankenship et al. | 408/1 R |
| 5,630,682 A | * | 5/1997 | Davey | 408/67 |
| 5,947,654 A | * | 9/1999 | Blankenship et al. | 408/72 B |
| 5,988,954 A | * | 11/1999 | Gaskin et al. | 408/67 |
| 6,036,412 A | * | 3/2000 | Dalla | 409/136 |
| 6,164,881 A | * | 12/2000 | Shono | 409/137 |
| 6,491,057 B1 | * | 12/2002 | Collins | 137/318 |
| 6,813,808 B2 | | 11/2004 | Nguyen et al. | |
| 7,073,989 B2 | * | 7/2006 | Erickson et al. | 408/97 |
| 7,347,651 B2 | * | 3/2008 | Hintze et al. | 408/67 |
| 7,934,892 B2 | * | 5/2011 | Fritsche et al. | 408/56 |
| 7,980,793 B2 | * | 7/2011 | Mathis | 408/1 R |
| 2005/0105977 A1 | * | 5/2005 | Ishihara | 408/1 R |

* cited by examiner

*Primary Examiner* — Eric A Gates
(74) *Attorney, Agent, or Firm* — Haynes and Boone, LLP

(57) ABSTRACT

A high speed handheld power drill includes a housing with a motor, a chuck rotationally driven by the motor, and a drill bit clamped in the chuck. A pressure foot is mounted on the housing for coaxial rotation about the drill bit and lockable in a selectable angular position relative to the housing. A drill guide is slidably disposed within the pressure foot at an outer end thereof and biased for coaxial sliding movement between the drill bit and pressure foot. A vacuum cuttings pickup and coolant fluid delivery tool is coupled to the drill guide and arranged to deliver coolant fluid to the drill bit and to remove drill cuttings and coolant fluid and vapor therefrom during drilling. A coolant fluid reservoir is coupled to the drill motor housing and adapted to deliver selectably metered amounts of coolant fluid to the cuttings pickup and coolant delivery tool during drilling.

19 Claims, 13 Drawing Sheets

HIGH SPEED HAND DRILL WITH SWIVELING PRESSURE FOOT AND INTEGRATED VACUUM PICKUP AND COOLANT DELIVERY DUCT

BACKGROUND

The present disclosure relates to power tools, in general, and in particular, to a high speed, handheld power drill incorporating an integrated swiveling vacuum pickup and coolant duct.

Handheld power tools may be used widely in a number of disparate manufacturing activities, including the aerospace, automotive, defense, shipbuilding, petroleum and construction industries, to name but a few. One of the more commonly used types of handheld power tools that finds widespread use may be handheld power drills, typically electrically or pneumatically powered. These drills may be used to drill holes into and through a wide variety of materials, including, without limitation, steel, aluminum, wood and composites, and for a wide variety of purposes.

While powered hand drills may provide a relatively accurate and efficient mechanism for the rapid creation of holes and bores in work pieces, existing tools also have a number of draw-backs associated with them. For example, shavings, dust, cuttings, cooling lubricant vapor, which may also be known as foreign object debris (FOD) from the drilling operation may become airborne and escape into the working environment, causing undesirable effects.

Some ergonomic features that may positively affect worker safety and comfort may not be included in current handheld power drills. Workers may typically be required to use goggles, face shields, hoods, masks, gloves and even shop rags to control airborne lubricant vapor, dust, and shavings. They may also use paper or plastic sheets, tarpaulins, shields and the like to cover portions of the work piece and adjacent parts to reduce their exposure to shavings, cuttings and lubricant. Typically, shavings, cuttings and lubricant residue are cleaned up after, and not during, the drilling operation.

The foregoing disadvantages may be undesirable. Accordingly, there is a need in a wide number of industries for a handheld, high speed power drill with features that reduce FOD.

BRIEF SUMMARY

In accordance with the exemplary embodiments disclosed herein, a high-speed, handheld power drill is provided that incorporates a swiveling pressure foot and associated vacuum pickup integrated with a coolant supply duct tool to pick up shavings and deliver coolant to the drill bit. The novel drill may include a swiveling, or rotatable pressure foot that may improve tool ergonomics, and an improved drill guide and integrated nozzle chip collector and cutting lubricant supply duct. The new, integrated drill design may provide a lighter, more ergonomic solution for drilling holes during, e.g., aircraft manufacturing and assembly processes.

In one exemplary embodiment, a high speed handheld power drill may comprise a housing having a motor disposed therein, a chuck disposed in the housing and rotationally driven by the motor, and an elongated drill bit having an inner end coupled in the chuck for rotation about the long axis of the bit. An elongated pressure foot may be mounted on the housing for coaxial rotation about the drill bit and through a plurality of selectable angular positions relative to the housing. Means may be provided for locking the pressure foot at a selected angular position relative to the drill motor housing. A drill guide may be slidably disposed within the pressure foot at an outer end thereof and biased against a spring for coaxial sliding movement between the drill bit and the pressure foot. A vacuum cuttings pickup and coolant fluid delivery tool may be coupled to the drill guide and arranged to deliver a liquid coolant to the drill bit, and to remove drill cuttings and coolant fluid vapor therefrom during drilling. An optically transparent coolant fluid reservoir may be coupled to the drill motor housing and arranged to deliver selectably metered amounts of coolant fluid to the cuttings pickup and coolant delivery tool during drilling.

The swiveling pressure foot of the novel drill may enable better access to the chuck and optimum placement of the dust and cuttings collector system without the need to rotate the entire drill motor housing relative to the work piece. Other improvements may include a more efficient usage of lubricant, better vacuum and FOD removal, and better tool durability. These benefits may result in faster manufacturing processes, less clean up and less worker fatigue.

The integrated lubricant/vacuum nozzle may enable proper lubricant flow while simultaneously achieving proper vacuum for optimum chip and coolant fluid vapor extraction. The ratcheting swivel of the drill may incorporate a unique design that may optimize tool space usage, allow for tool interchangeability, and improve ergonomics by maintaining a neutral operator drilling posture, even around obstructions, such as adjacent "cleco" fasteners. An improved combination elbow fitting may reroute the cutting lubricant tubing. This, in turn, may prevent damage to the conduit and improve ergonomics by maintaining a clear handle grip area.

A better understanding of the above and many other features and advantages of the novel high-speed, handheld power drill of the present disclosure may be obtained from a consideration of the detailed description of an exemplary embodiment thereof below, particular if such consideration is made in conjunction with the appended drawings, wherein like reference numbers are used to refer to like elements in the respective figures thereof.

DETAILED DESCRIPTION

Figure 1:
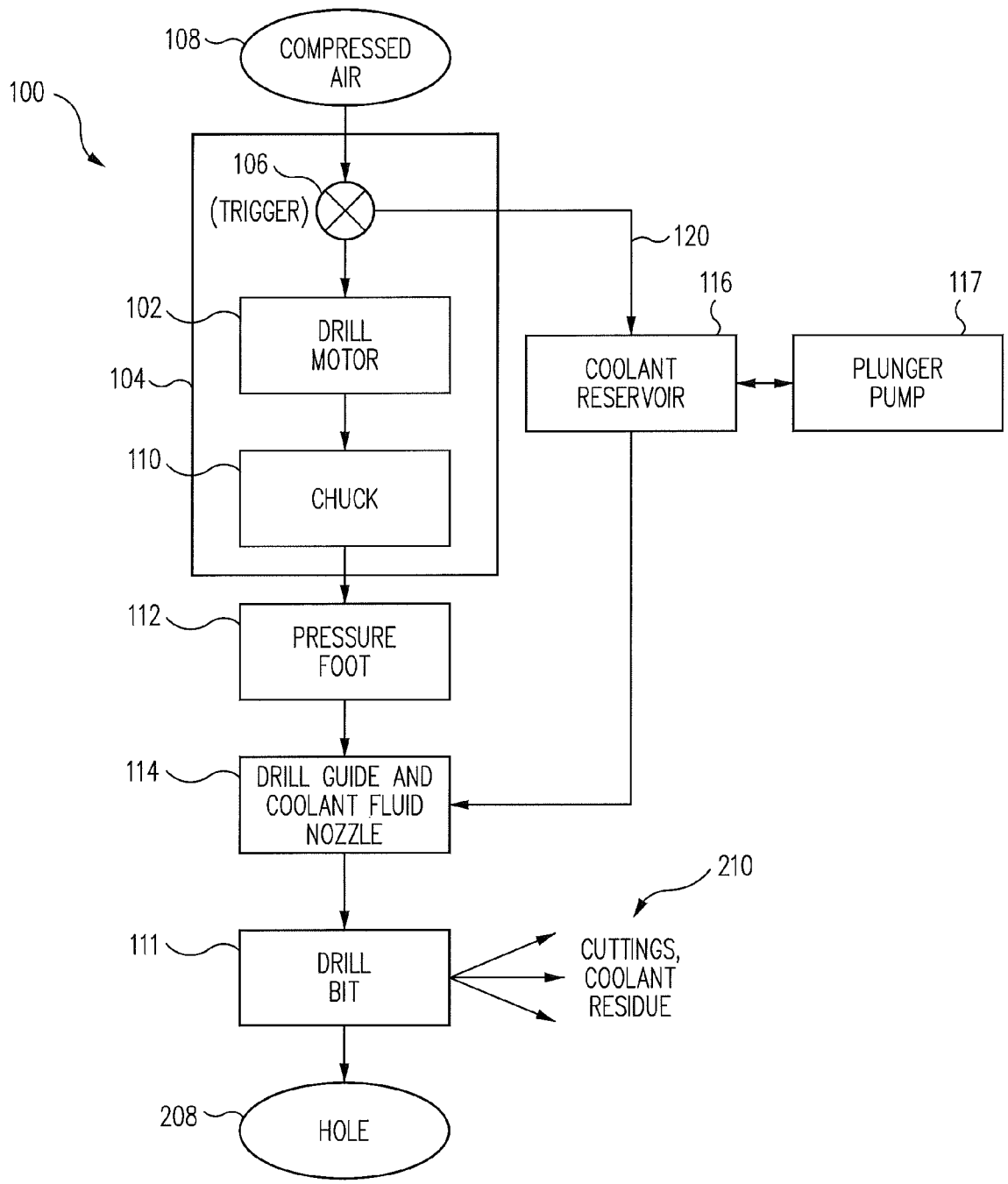
FIG. 1 is a functional block diagram of a high speed, handheld power drill in accordance with the prior art.

A high speed, handheld power drill 100 in accordance with the prior art is illustrated in the functional block diagram of FIG. 1. With reference to FIG. 1, the conventional power hand drill 100 may comprise a drill motor 102, which may be enclosed in a housing 104 and provided with a pistol grip handle (not shown), which may have a pull-trigger 106 for actuating the drill motor 102, which may be powered by compressed air supplied from a compressed air source 108.

A conventional chuck 110 for holding a drill bit 111 may also be disposed within the housing 104 and coupled to the motor 102 for rotation thereby. An elongated, fluted twist drill bit 111 may have an inner end clamped in the chuck 110 for rotation by the motor 102 and chuck 110 about a long axis thereof, and may include an opposite second, or cutting end (not shown) that extends forwardly from the housing 104. An elongated, annular "pressure foot" 112 may be fixed at the front end of the housing 104 and may extend forwardly therefrom concentrically about the drill bit 111. A drill guide and coolant fluid nozzle 114 may be slidably disposed within the pressure foot 112 at an outer end thereof and biased for coaxial sliding movement between the drill bit 111 and the pressure foot 112.

The conventional drill 100 may also include a cutting and/or coolant fluid reservoir 116, which may be coupled to the drill motor housing 104. The operator of the drill 100 may draw coolant fluid into the reservoir 116 manually prior to a drilling operation by pushing on a plunger mechanism disposed internally of the reservoir and extending rearwardly therefrom. In the conventional drill embodiment 100 of FIG. 1, the drill motor 102 may be powered by compressed air, and compressed air may be coupled from the drill motor 102 through a compressed air conduit 120 during operation and may force liquid coolant from the coolant fluid reservoir 116 via a pressure conduit 122 to a coolant fluid nozzle (not shown) located in the drill guide 114.

Figure 5:
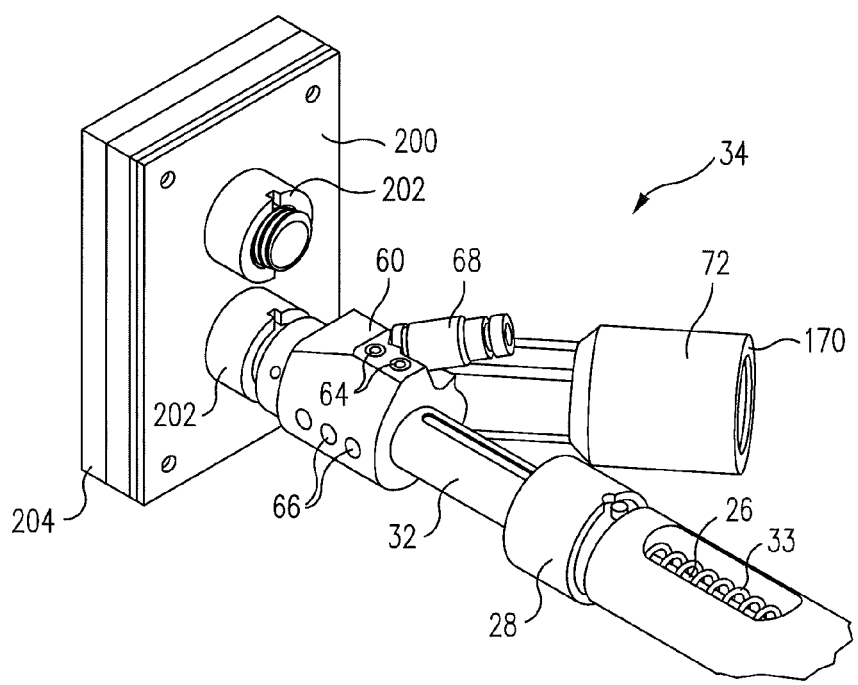
FIG. 5 is a partial perspective and breakaway view of the pressure foot and a vacuum cuttings pickup and coolant fluid delivery tool of the exemplary drill, showing a drill guide of the drill inserted into a guide bushing of a drill jig preparatory to the drilling of a hole in a work piece.
Figure 8:
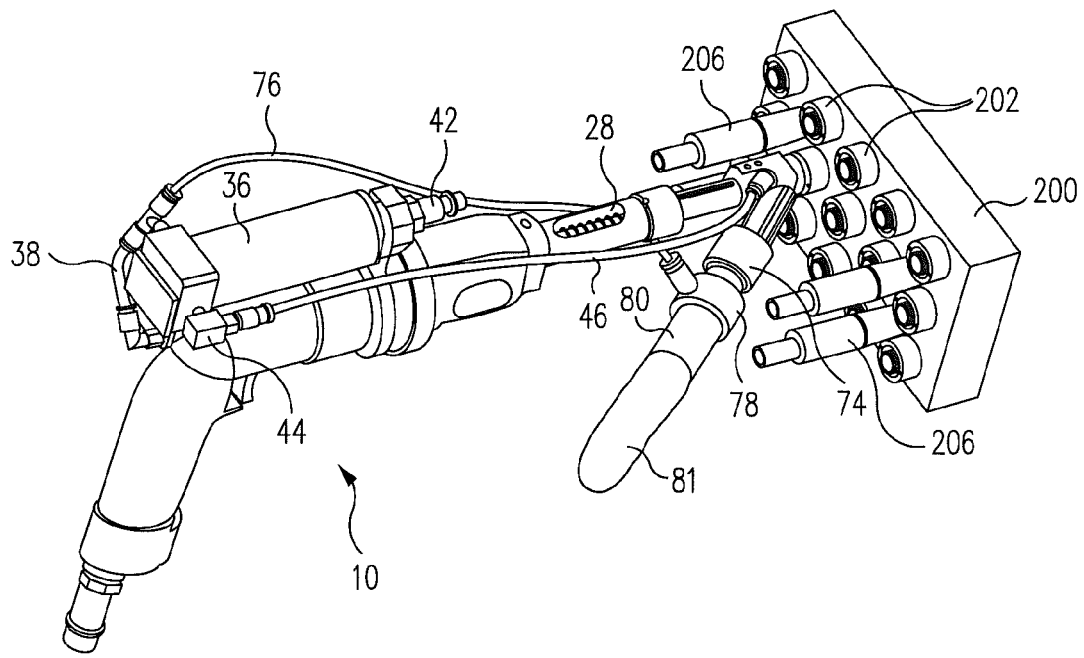
FIG. 8 is an upper rear perspective view of the exemplary drill and an optional onboard vacuum unit and cuttings collection conduit of the drill, shown with the cutting end of the drill guide engaged in a guide bushing of a drill jig.
Figure 9:
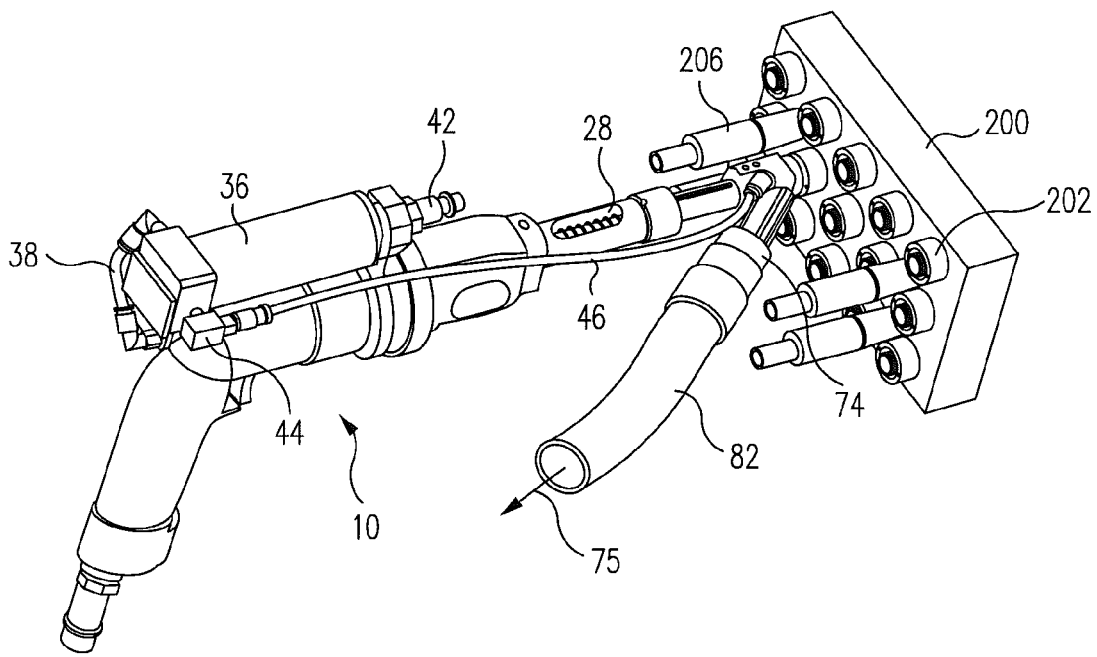
FIG. 9 is a partial upper rear perspective view of the exemplary drill coupled to a remote cuttings collector vacuum unit via a hose, with the cutting end of the drill guide shown engaged in a guide bushing of a drill jig.

In a typical drilling operation using the conventional drill 100, a drill jig or template 200 such as those illustrated in FIGS. 5, 8 and 9, may be provided. These may include a plurality of guide holes, each having a guide bushing 202 disposed therein, and may be temporarily fixed to the work piece 204 at a selected position using temporary fastening pins 206, for example, and without limitation, clecos. The operator may then insert the front or distal end (not shown) of the drill guide and coolant fluid nozzle 114 of the drill 100 into the guide bushing 202 corresponding to the location at which a hole 208 is desired to be drilled and may pull the trigger 106 to actuate the drill motor 102 and cause the drill bit 111 to rotate.

As the drill bit rotates, the operator may push the drill 100 toward the work piece 204, causing the rotating bit 111 to cut into the work piece through the guide bushing 202 and form a hole 208 in the work piece 204 at the desired location and to the desired depth. During the drilling operation, the drill guide 114 may retract coaxially within the pressure foot 112 relative to the drill bit 111 and against the force of a compression spring disposed therein, and coolant fluid may be simultaneously forced from the reservoir 116 via the pressure conduit 122 to the coolant nozzle in the drill guide and coolant nozzle 114. The nozzle may spray pressurized coolant fluid onto the drill bit 111 through a nozzle opening (not shown) in the drill guide 114 to cool the bit 111 as it cuts into the work piece 204, and the flutes of the drill bit 111 may carry drill cuttings, liquid and vaporous coolant fluid 210 and other debris from the hole 208 to the drill guide 114, where they may be deposited in undesirable locations.

As evident from FIG. 1, the conventional power drill 100 includes a number of drawbacks that may be undesirable. For example, the pressure foot 112, and hence, the drill guide and coolant fluid supply nozzle 114, may both be fixed to the housing 104 of the drill 100. Hence, in tight locations where adjacent structures may interfere with the drill guide and coolant fluid nozzle 114 and/or the coolant fluid supply conduit 122, it may be necessary for the operator to rotate the entire drill 100 about the long axis thereof to eliminate such interference before a drilling operation can commence. In this situation, the operator may have to position himself awkwardly, and/or may have to hold the drill in an awkward attitude in order to drill the hole 208.

Additionally, the coolant fluid reservoir 116 filling mechanism, the external compressed air supply conduit 120 and the coolant fluid pressure delivery conduit 122 may all protrude rearwardly from the drill 100 and toward the operator so as to interfere with the operator's grasp and control of the drill 100 during its operation. Also, since the coolant delivery conduit 122 may extend out radially from the coolant fluid reservoir 116, the conduit 122 may become linked and/or damaged when the operator lays the drill 100 on a table or work bench.

The coolant fluid reservoir 116 may also protrude so far forward that it may obscure openings in the housing 104 through which a conventional chuck wrench may be inserted to loosen the chuck 110 and change drill bits 111. Additionally, no means may be provided to determine the amount of coolant fluid contained in the reservoir 116, or whether an amount sufficient to complete the drilling of a hole 208 is present, which may necessitate frequent, often un-necessary refills of the coolant fluid reservoir 116. Further, no mechanism may be provided to meter the amount of coolant fluid delivered to the coolant fluid nozzle of the drill guide 114, which may result in either an insufficient amount of coolant fluid being delivered to the drill bit and a concomitant acceleration in bit wear, or an excess amount of coolant fluid being delivered and a concomitant waste of coolant fluid and an undesirable effect on the work area.

Additionally, as discussed above, the drill cuttings and coolant fluid liquid and vapor 210 that may be carried from the hole 208 and deposited onto adjacent surfaces and/or blown onto undesirable locations.

Figure 2A:
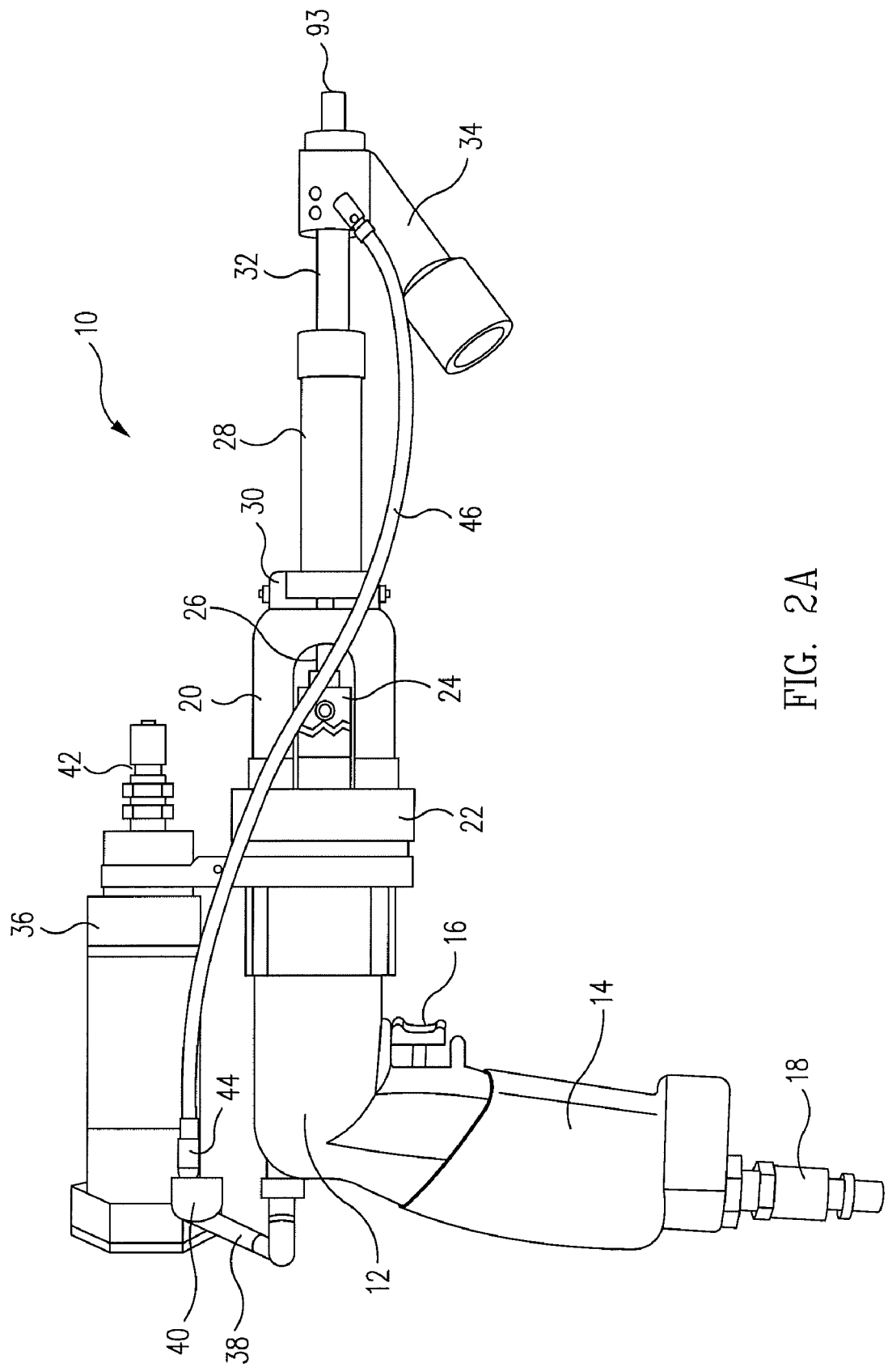
FIG. 2A is a side elevation view of an exemplary embodiment of a high speed, handheld power drill in accordance with the present disclosure.
Figure 2B:
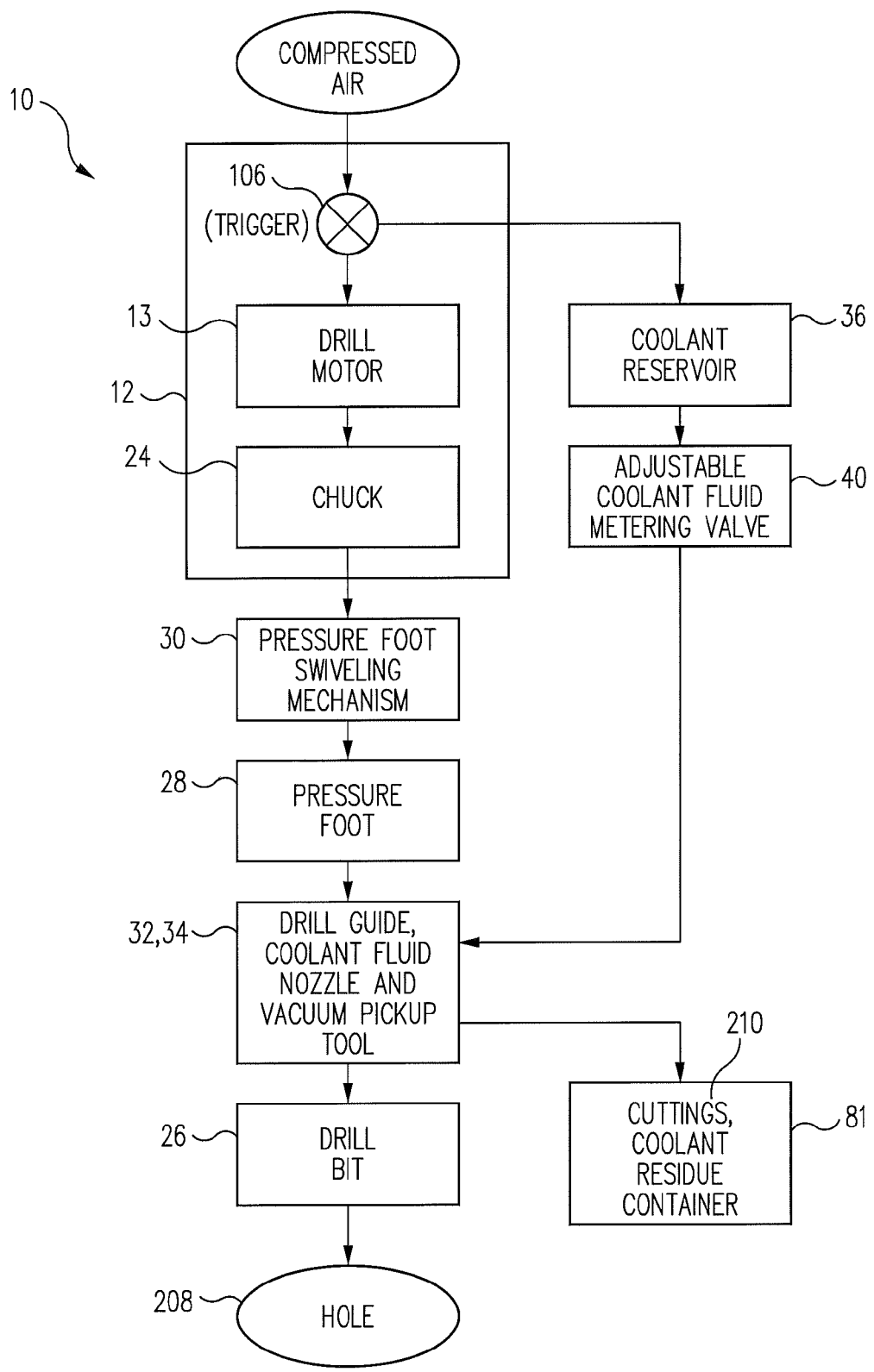
FIG. 2B is a functional block diagram of the exemplary power drill of FIG. 2A.

An exemplary embodiment of a high speed, handheld power drill 10 in accordance with the present disclosure that may satisfy the needs for an improved power drill 100 is illustrated in the side elevation and functional block diagram views of FIGS. 2A and 2B, respectively. With reference to FIGS. 2A and 2B, the improved power drill 10 may comprise a drill housing 12 containing an air powered drill motor 13 (not visible in FIG. 2A) and having a pistol grip 14 with a trigger 16 for actuating the drill motor 13. Compressed air for powering the drill may be input through a quick-disconnect or other type of fitting 18 disposed at the butt-end of the pistol grip. Other motor power sources are within the contemplation of those of ordinary skill in the art. The motor housing 12 also comprises a front housing 20 that may be quickly and easily coupled and decoupled from the motor housing 12 by a threaded collar 22 for ease of tool interchangeability.

A conventional, keyed chuck 24 may be disposed in the front housing 20. The chuck 24 may be coupled to and rotationally driven by the drill motor. An elongated drill bit 26 may have an inner end (not shown) coupled in the chuck 24 for rotation about a long axis of the bit, and a distal, cutting end 94 disposed opposite thereto. An elongated pressure foot 28 may be mounted on the front end of the front housing 20. The pressure foot 28 may be mounted for coaxial rotation about the long axis of the drill bit 26 and through a plurality of selectable angular positions relative to the housings 12 and 20 by means of a novel "swiveling" mechanism 30 described in more detail below.

An enhanced drill guide 32 may be slidably disposed within the pressure foot 28 at an outer, or distal end 94 thereof. As in the conventional drill 100, the drill guide 32 may be biased by a spring 33 (see FIG. 3) disposed in the pressure foot 28 for coaxial, in-and-out sliding movement between the drill bit 26 and the pressure foot 28 in response to a force exerted on the front, or distal end 93 thereof. A vacuum cuttings pickup and coolant fluid delivery tool 34 may be coupled to the drill guide 32 and arranged to deliver a fluid, such as, without limitation, a liquid coolant or cutting lubricant, to the drill bit 26, and to remove drill cuttings and coolant fluid vapor and/or other FOD therefrom by means of a vacuum suction during drilling in a manner described in more detail below. An improved coolant fluid reservoir 36 may be mounted on the drill motor housing 12 and, as discussed below, may be adapted to deliver adjustably metered amounts of coolant fluid to the cuttings pickup and coolant delivery tool 34 during drilling.

As illustrated in FIG. 2A, a pressurized air supply line 38 may be coupled from the rear end of the motor housing 12 to the reservoir 36. In response to actuation of the trigger 16, pressurized air may be fed through a right-angled fitting and conduit 38 to the coolant fluid reservoir 36. The pressurized air may be used to pressurize the coolant fluid in the reservoir 36, which may includes an adjustable valve 40 disposed at the outlet of the reservoir 36 that may enable the operator to selectably meter the amount of fluid flowing from the reservoir to the drill bit 26 during a drilling operation, and thereby ensure that the amount of coolant fluid flow is neither too little nor too great, but instead, in an amount appropriate to the particular drilling job at hand. Additionally, the body of the coolant fluid reservoir 36 may be made of a transparent plastic or other suitable material or materials combination, which may enable the operator to determine with a glance the amount of fluid contained in the reservoir 36 at any given time.

It may also be noted in FIG. 2A that the fluid metering reservoir 36 may also eliminate the manually actuated reservoir filling mechanism of the conventional drill 110, thereby eliminating any interference between the operator's hand and the drill 10. Instead, the reservoir may be filled by simply pumping the coolant fluid from a source of coolant fluid, e.g., a nearby container having a manually actuated pump thereon, through a quick-disconnect inlet fitting 42 until the reservoir is full, which may be visually determined by the operator, as above.

Another advantageous feature of the embodiment of FIG. 2A may be the provision of a coaxial, right-angle, or "elbow" fitting 44 at the reservoir's coolant fluid outlet. The elbow fitting may enable a coolant fluid delivery conduit 46 that conveys pressurized coolant fluid to the vacuum cuttings pickup and coolant fluid delivery tool 34 to be coupled to the reservoir 36 in a tight, right-angled bend. The provision of the right-angle fitting 44 may eliminate any interference between the conduit 46 and the operator's hand, and additionally, may prevent the conduit from being kinked or damaged when the operator may lay the drill 10 down on a table or work bench, as described in more detail below.

Figure 3:
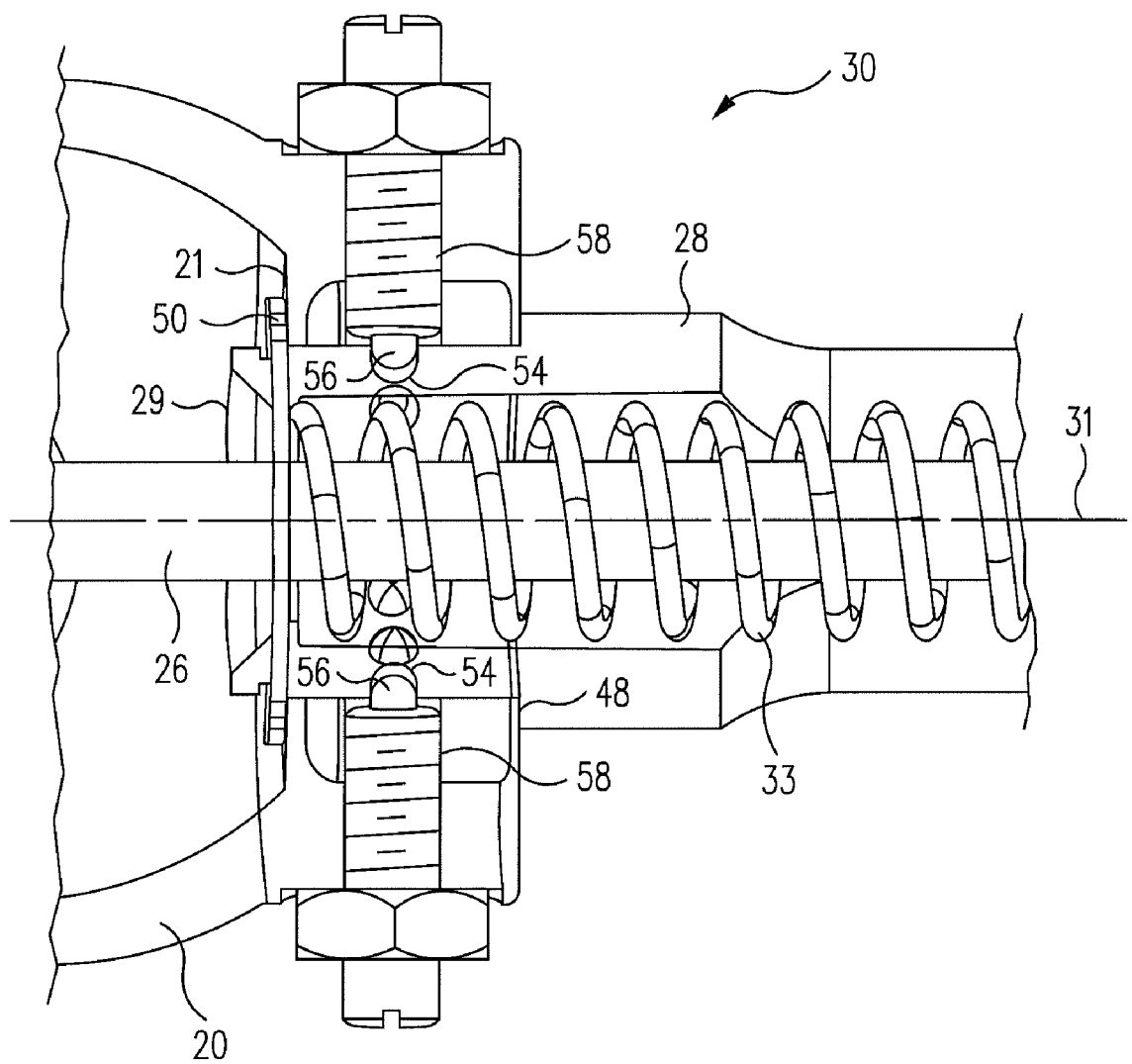
FIG. 3 is a partial cross-sectional view of the exemplary power drill of FIG. 2A, showing details of a pressure foot swiveling mechanism thereof.

FIG. 3 is a partial cross-sectional view of the exemplary drill 10 of FIG. 2A, showing details of the pressure foot 28 swiveling mechanism 30 thereof. As illustrated in FIG. 3, an inner end 29 of the pressure foot 28 may be rotatably disposed in an opening at the front end of the front housing 20 of the drill motor for coaxial rotation about the long axis 31 of the drill bit 26, and may be retained axially therein by means of a circumferential shoulder 48 formed at the inner end of the pressure foot disposed in abutment with a corresponding surface of the front housing 20, in conjunction with a locking ring 50 engaged in a corresponding groove formed at the inner end 29 and disposed in abutment with an inner surface 21 of the front motor housing 20.

In the particular exemplary embodiment of FIG. 3, the pressure foot swiveling mechanism 30 may also include apparatus for locking the pressure foot 28 at selected angular orientations relative to the front housing 20. In one embodiment the locking apparatus may comprise a plurality of locking indentations 54 disposed circumferentially about an outer surface of the inner end of the pressure foot 28, and a pair of radially opposing, spring-biased locking balls 56 respectively located at the inner ends of threaded shafts 58 disposed in the front housing 20. Each of the locking balls may be arranged to engage a respective one of the locking indentations 54 of the pressure foot 28 at selected angular orientations of the pressure foot relative to the housing 20. The radial force exerted by the locking balls 56 in the corresponding indentations 54 may be adjusted by adjusting the radial position of the respective threaded shafts 58 in the housing 20 with, for example, and without limitation, a screwdriver, such that the pressure foot 28 may be positively locked in the particular relative angular orientation thereof selected by the operator, yet such that the pressure foot may easily be rotated manually about the long axis 31 of the drill bit 26 by the operator to a new angular orientation relative to the drill 10 when desired.

Thus, the pressure foot swiveling mechanism 30 of the exemplary drill 10 may enable the operator to easily adjust the angular position of the pressure foot 28 and the vacuum cuttings pickup and coolant fluid delivery tool 34 attached thereto, relative to the front housing 20 of the drill motor, and hence, relative to a work piece 104 in which a hole is to be drilled. Hence, in tight locations where adjacent structure might otherwise interfere with the vacuum cuttings pickup and coolant fluid delivery tool 34, the operator may not be obliged to position himself awkwardly, and/or to hold the drill in an awkward attitude in order to drill the hole. Instead, the operator may simply rotate the pressure foot 28 and vacuum cuttings pickup and coolant fluid delivery tool 34 about the axis 31 of the drill bit 26 to an angular position that eliminates the interference before commencing the drilling operation.

Figure 4:
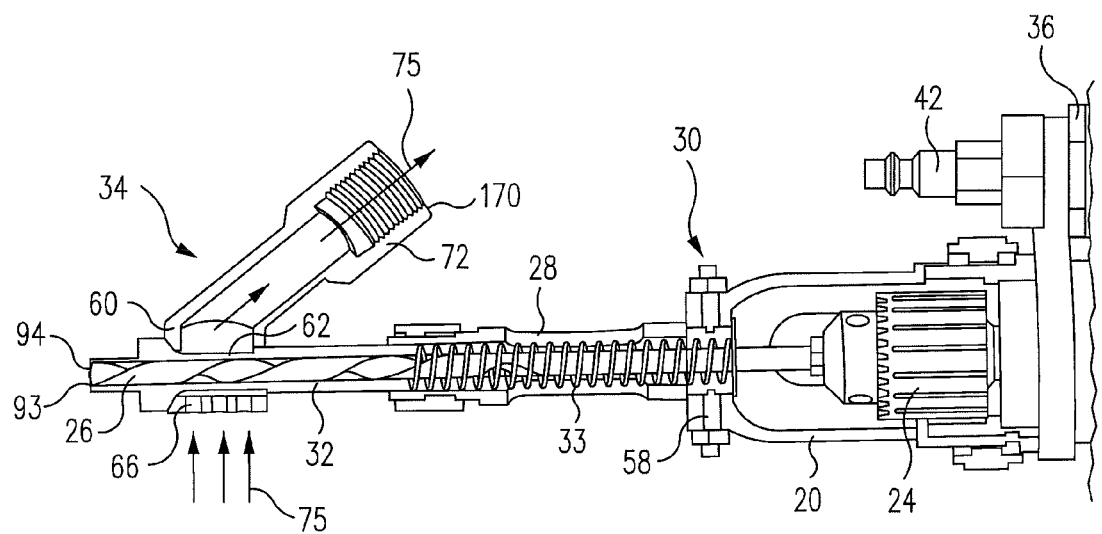
FIG. 4 is a partial cross-sectional view of the swiveling pressure foot and a vacuum cuttings pickup and coolant fluid delivery tool of the drill.
Figure 16:
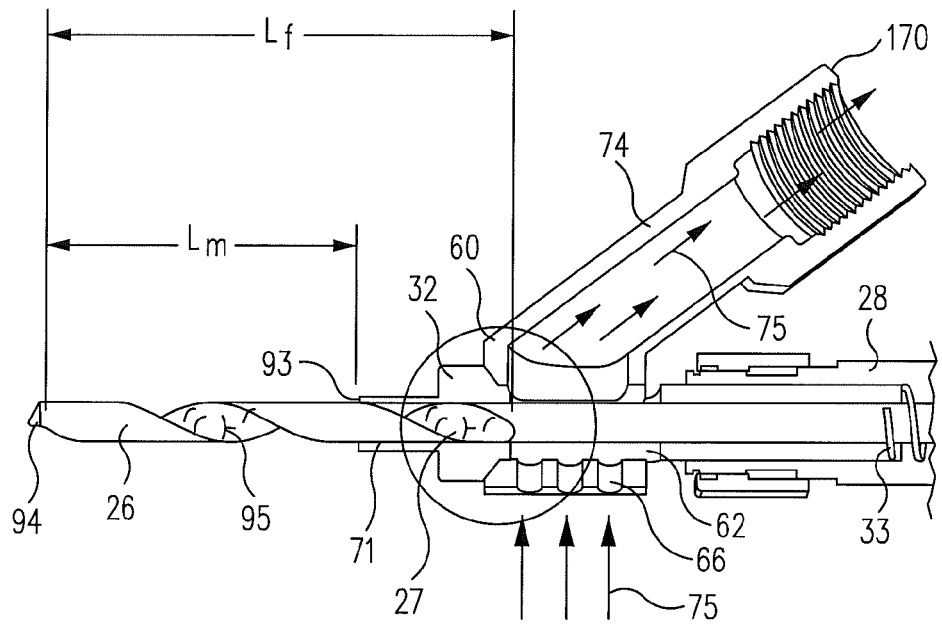
FIGS. 16 and 17 are enlarged partial cross-sectional views of the vacuum cuttings pickup and coolant fluid delivery tool, enhanced drill guide and a drill bit of the novel drill.
Figure 17:
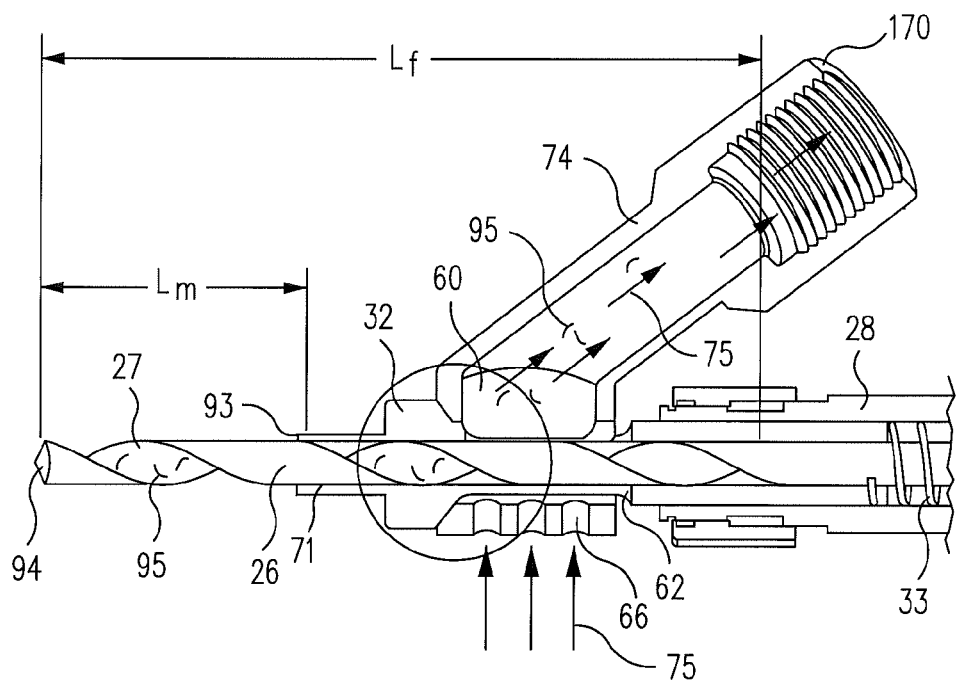

FIG. 4 is a partial cross-sectional view showing the front motor housing 20, the drill chuck 24 contained therein, the drill bit 26 retained in the chuck 24, the swiveling pressure foot 28, the enhanced drill guide 32 and the vacuum cuttings pickup and coolant fluid delivery tool 34. FIG. 5 is an enlarged partial perspective and breakaway view of the pressure foot 28 and vacuum cuttings pickup and coolant fluid delivery tool 34, showing the distal end 93 of the drill guide 32 inserted into a guide bushing 202 of a drill jig or fixture 200 preparatory to the drilling of a hole in a work piece 204, in a manner similar to that described above in connection with the conventional power drill 100 of FIG. 1. As illustrated in FIG. 4, the front or distal end 93 of the drill guide 32 may be co-terminus with the distal or cutting end 94 (see FIG. 16) of the drill bit 26 when disposed in the extended position and prior to the drilling of a hole, and may then retract, together with the vacuum cuttings pickup and coolant fluid delivery tool 34 attached thereto, toward the body of the drill 10 as the drill bit 26 cuts into the work piece 204, as illustrated in FIGS. 16 and 17.

Figure 6:
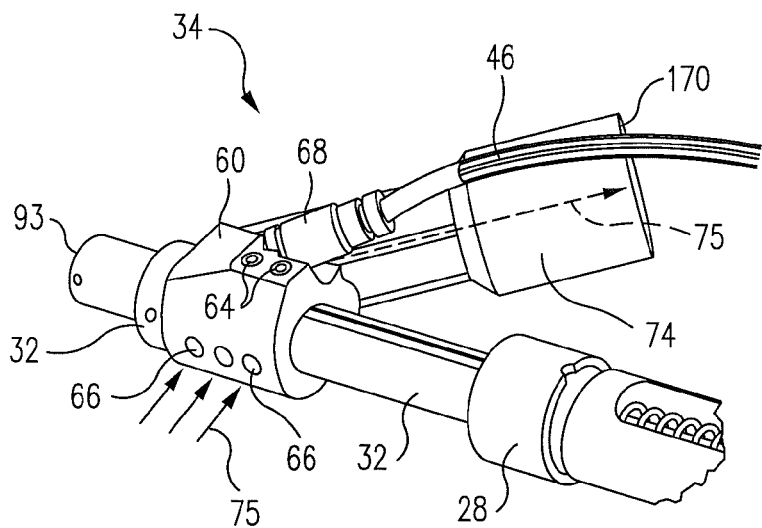
FIG. 6 is an enlarged partial perspective view of the swiveling pressure foot, vacuum cuttings pickup and coolant fluid delivery tool and drill guide of the exemplary drill.
Figure 7:
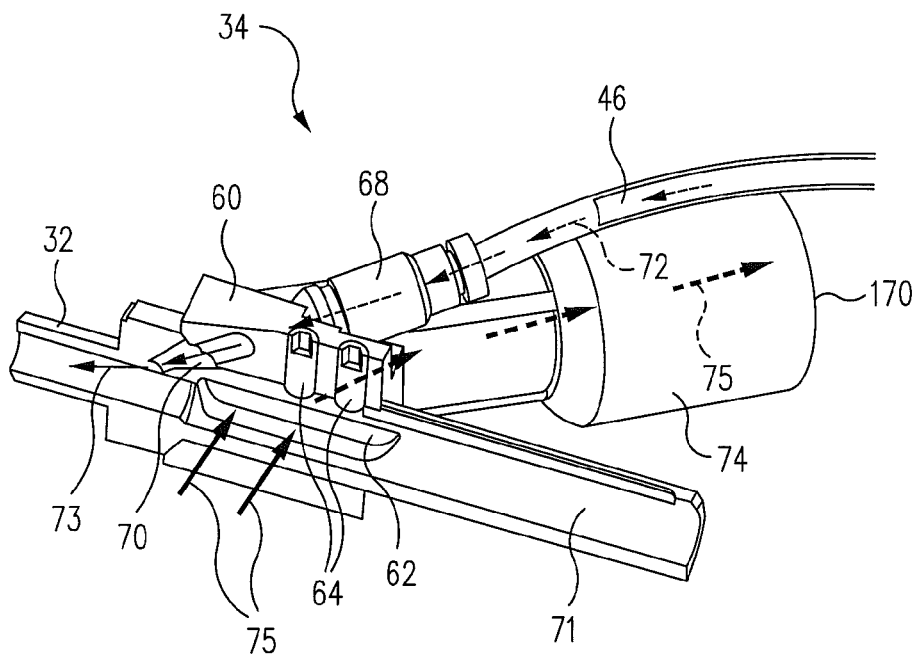
FIG. 7 is an enlarged partial breakaway view of the vacuum cuttings pickup and coolant fluid delivery tool and drill guide of FIG. 6.

FIG. 6 is an enlarged partial perspective view of the swiveling pressure foot 28, vacuum cuttings pickup and coolant fluid delivery tool 34 and enhanced drill guide 32 of the exemplary drill 10, and FIG. 7 is an enlarged partial breakaway view of the vacuum cuttings pickup and coolant fluid delivery tool 34 and enhanced drill guide 32.

As illustrated in FIGS. 4-7, the cuttings pickup and coolant fluid delivery tool 34 may comprise an annular body 60 disposed concentrically about the drill guide 32 and in fluid communication with an elongated slot 62 (see also, FIGS. 11 and 12) formed in the drill guide. The annular body 60 may fastened to the drill guide 32 by means of a plurality of socket head screws 64 as described below and may include a plurality of radial air vent holes 66 extending there-through that may also be disposed in fluid communication with the elongated drill guide slot 62.

Figure 12:
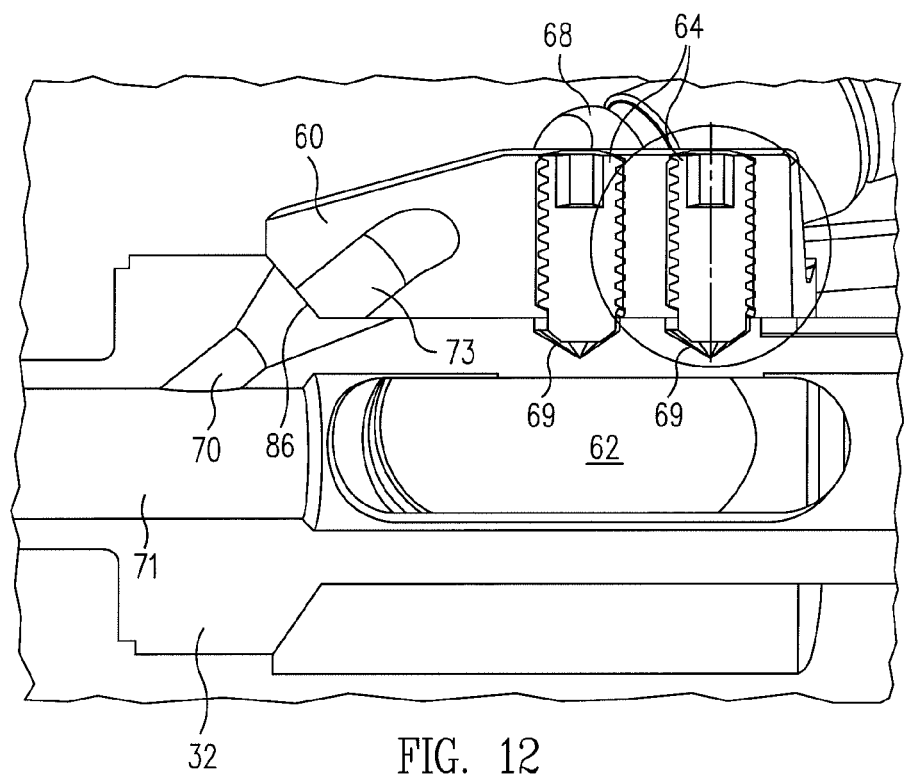
FIG. 12 is a partial cross-sectional view of the vacuum cuttings pickup and coolant fluid delivery tool and enhanced drill guide of the improved drill, showing the coupling of a coolant fluid duct thereof to a coolant fluid nozzle and a pair of offset socket screws thereof.

As illustrated in FIGS. 5 through 7 and in the enlarged cross-sectional view of FIG. 12, a coolant fluid inlet 68 may extend into the annular body 60, and the drill guide may define a nozzle 70 at an inner end of the inlet 68 that is arranged to direct pressurized coolant fluid into the lumen 71 of the drill guide and onto the drill bit 26. Thus, as illustrated in FIGS. 6 and 7, during a drilling operation, pressurized coolant fluid may be conveyed to the coolant fluid inlet 68 via the coaxial coolant fluid delivery conduit 46. The delivery conduit 46 may extend from the coolant fluid reservoir 36, as indicated by the dashed arrows 72 in FIG. 7. The coolant fluid may then flow into the lumen 71 of the drill guide 32 via the nozzle 70. The coolant fluid may then flow onto the drill bit 26 (omitted in FIGS. 7 and 12 for clarity), as indicated by the solid arrows 73 in FIG. 7.

The vacuum cuttings pickup and coolant fluid delivery tool 34 may also include a vacuum outlet 74 extending out from the annular body 60 and disposed in fluid communication with the drill guide slot 62. During a drilling operation, drill cuttings and coolant fluid and vapor 210 may be carried to the elongated slot 62 of the drill guide 32 by the helical flutes 27 of the drill bit 26. Hence, if a vacuum is applied to the outer end of the vacuum outlet 72, it may be used to suck the cuttings and coolant fluid and vapor away from the slot 62 and into a waste container for later disposal. As a result, the work piece 204, surrounding areas and the ambient atmosphere may remain substantially free of cuttings and coolant fluid and vapor 210, thereby reducing or eliminating some operator protective gear, extensive masking of the work piece and environs, and subsequent cleanup.

As illustrated in FIG. 8, in one embodiment, the novel drill 10 may incorporate an "on-board" mechanism for creating a vacuum to clean by suction force at the outer end of the vacuum outlet 74 of the cuttings pickup and coolant fluid delivery tool 34 during drilling. In this embodiment, pressurized air may be coupled off from the pressurized air inlet conduit 38 of the coolant fluid reservoir 36 and conveyed by a pressure conduit 76 to a vacuum generator 78 located at the outer end of the vacuum outlet 74. The vacuum generator 78 may direct the pressurized air outwardly from the outlet, and may cause a low pressure area, or vacuum, to be formed internally of the vacuum outlet by means of the Bernoulli effect. The vacuum may cause ambient air to be sucked through the vent openings 66 in the annular body 60 of the vacuum tool 34, in the direction of the arrows 75 in FIGS. 6, 7, 16 and 17, and the air may entrain the cuttings and excess coolant fluid and vapor deposited at the elongated slot 62 of the drill guide 32 by the drill bit flutes and carry them out through the vacuum outlet 74, a conduit 80, and into a container 81, e.g., a closed-ended cloth bag coupled to the outlet end of the vacuum outlet 74, where they may be collected for later disposal.

As illustrated in FIG. 9, in another possible embodiment, the onboard mechanism for creating the vacuum may be omitted, and the outer end 170 of the vacuum outlet 74 may simply be coupled to a remote vacuum source (not illustrated), e.g., a shop vacuum, by means of a vacuum hose 82.

As may be noted in FIGS. 4-7, both the coolant fluid inlet 68 and vacuum outlet 74 may form an acute angle with the axis of the annular body 60 of the cuttings pickup and coolant fluid delivery tool 34, such that they, and the various conduits or containers leading into or away from them, are directed away from the drilling site.

Figure 10:
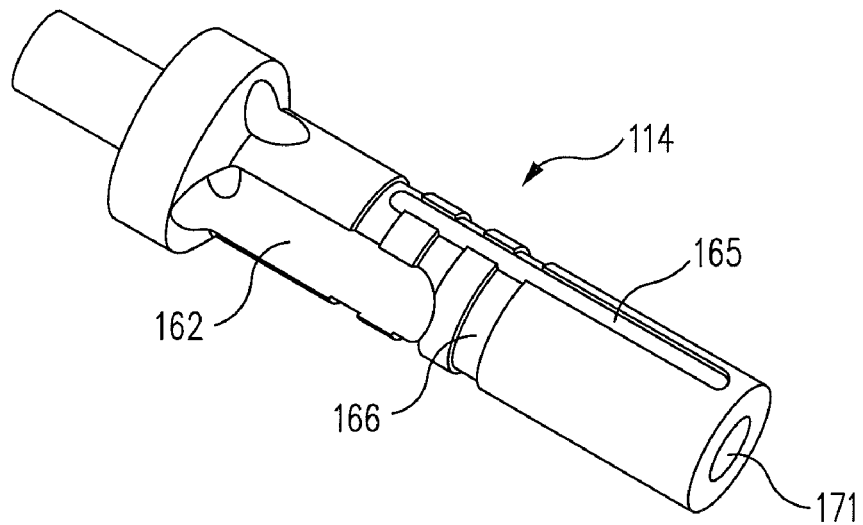
FIG. 10 is a perspective view of a drill guide of the prior art drill of FIG. 1.
Figure 11:
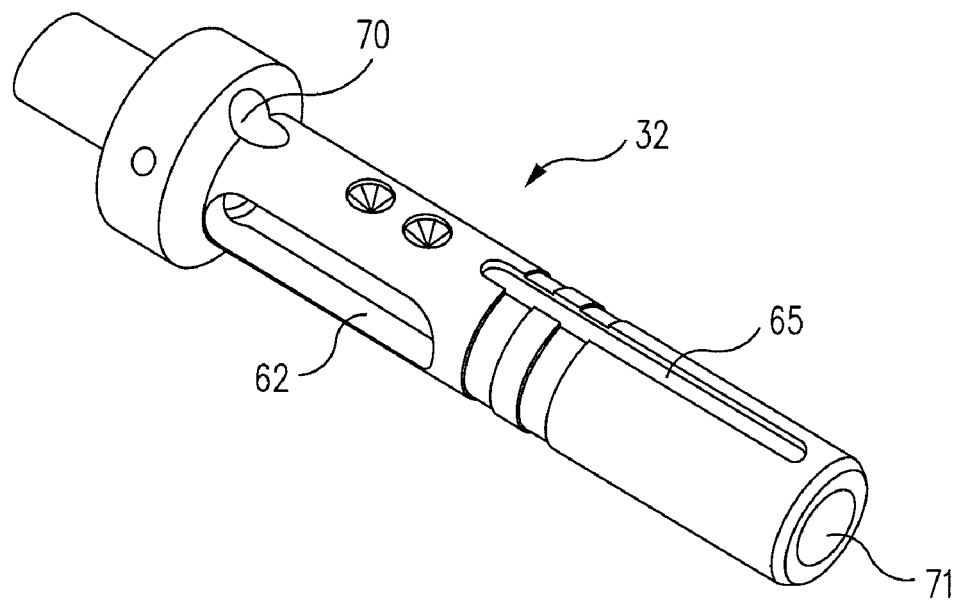
FIG. 11 is a perspective view of an exemplary embodiment of an enhanced drill guide used in the high speed, handheld power drill of the present disclosure.

FIG. 10 is a perspective view of the drill guide and coolant fluid nozzle 114 of the prior art drill 100 of FIG. 1, and FIG. 11 is a perspective view of the enhanced drill guide 32 of the high speed, handheld power drill 10 of the present disclosure. As may be seen by a comparison of the two figures, each of the two drill guides may include a respective elongated axial groove 165, 65 on an upper surface thereof that may be used to align the respective guides with the respective pressure feet 112, 28 during relative axial movement of the guides. The prior art drill guide 114 may also include a circumferential groove 166 provided to allow the drill guide to stop at a certain depth relative to the respective pressure foot 112 by using a clip (not illustrated) which may couple onto the groove 166. In the prior art drill, these grooves may be located close to the elongated slot 62, and may act to weaken the drill guide.

However, as discussed above, since the pressure foot 28 and the improved drill guide 32 may be extended longitudinally to make room for the cuttings pickup and coolant fluid delivery tool 34, the circumferential groove 166 may be relocated to a position behind the elongated slot 62 to control the depth of the drill, and the axial groove 65 may be shortened. As those of skill in the art will appreciate, moving the axial groove 65 and the circumferential grooves 166 from above the elongated slot 62 may substantially decrease the likelihood of breakage of the drill guide 32 at the elongated slot. Additionally, as a consequence of the vacuum pressure, the cuttings may be evacuated from the drill bit 26 flute(s) rapidly, thereby enabling the width of the elongated slot 62 to be decreased relative to that of the conventional drill guide 114, while enabling the same volume of cuttings and coolant fluid to be extracted through the narrower slot 62 as through the wider slot 162, and at the same time, further reducing the likelihood of breakage of the enhanced drill guide 32 at the slot 62, as compared to the conventional drill guide 114.

Figure 13:
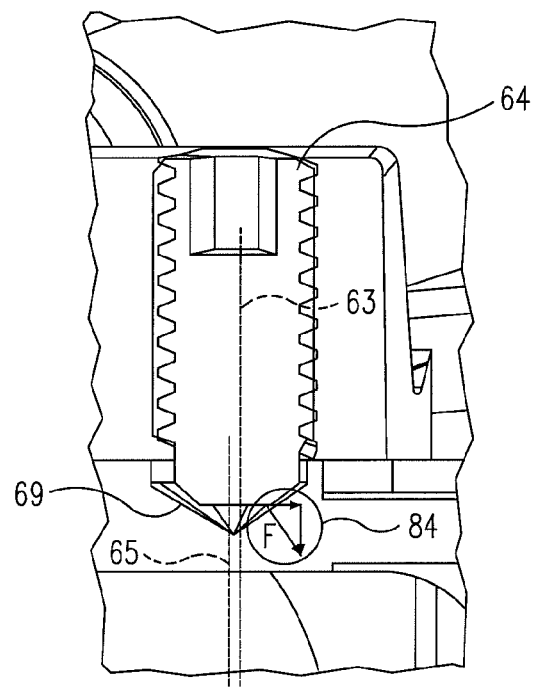
FIG. 13 is an enlarged partial cross-sectional detail view of the encircled area of FIG. 12 enclosing one of the offset socket screws of the vacuum cuttings pickup and coolant fluid delivery tool and enhanced drill guide.

FIG. 12 is an enlarged partial cross-sectional view of the vacuum cuttings pickup and coolant fluid delivery tool 34 and enhanced drill guide 32 of the improved drill 10, showing the coupling of the duct 73 of the cooling fluid inlet 68 to the coolant fluid nozzle 70 defined by the drill guide 32, and the socket head screws 64 used to couple the annular body 60 of the tool 34 to the drill guide 32. FIG. 13 is an enlarged partial cross-sectional detailed breakout view of one of the screws 64 of the vacuum cuttings pickup and coolant fluid delivery tool 34 and enhanced drill guide 32 of FIG. 12, as seen in the encircled area therein. As illustrated in these figures, the respective inner ends of each socket head screw 64 may engage in a respective conical countersink 69 formed in the drill guide 32. As illustrated in the enlarged detail breakout view of FIG. 13, the centerline of each socket screw 64, indicated by a first dashed line 63 may be offset laterally relative to the centerline, indicated by a second dashed line 65, of the corresponding countersink 69. As a result of this arrangement, when the socket screws 64 are tightened down, a wedging effect may be created at the interface between the conical screw ends and corresponding sockets, as indicated by the force diagram 84 of FIG. 13, which in turn, may urge the annular tool body 60 axially against the angled interface 86 between the tool body 60 and the drill guide 32. The resulting forceful abutment between the cooling fluid inlet duct 73 and the coolant fluid nozzle 70 of the drill guide 32 may ensure a tight engagement between the duct and nozzle that may prevent any leakage of coolant fluid at the interface 86 between the two features.

Figure 14:
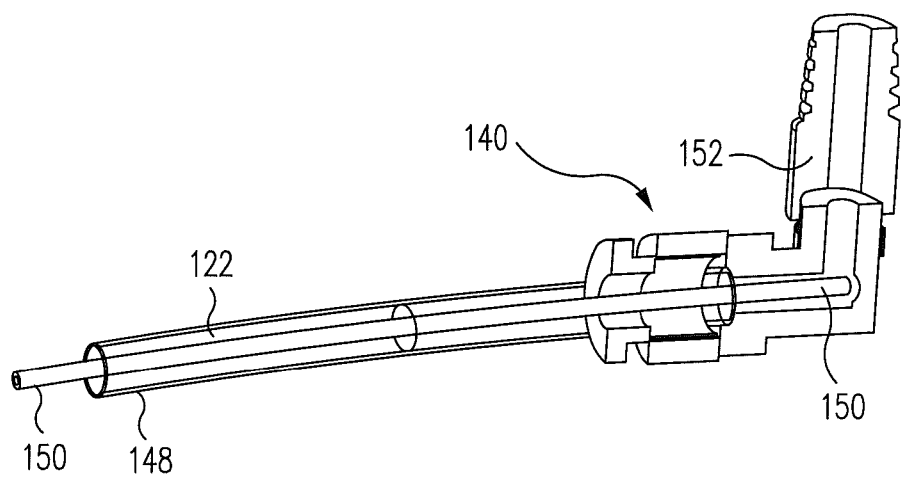
FIG. 14 is a cross-sectional view of an elbow fitting of the prior art drill of FIG. 1.
Figure 15:
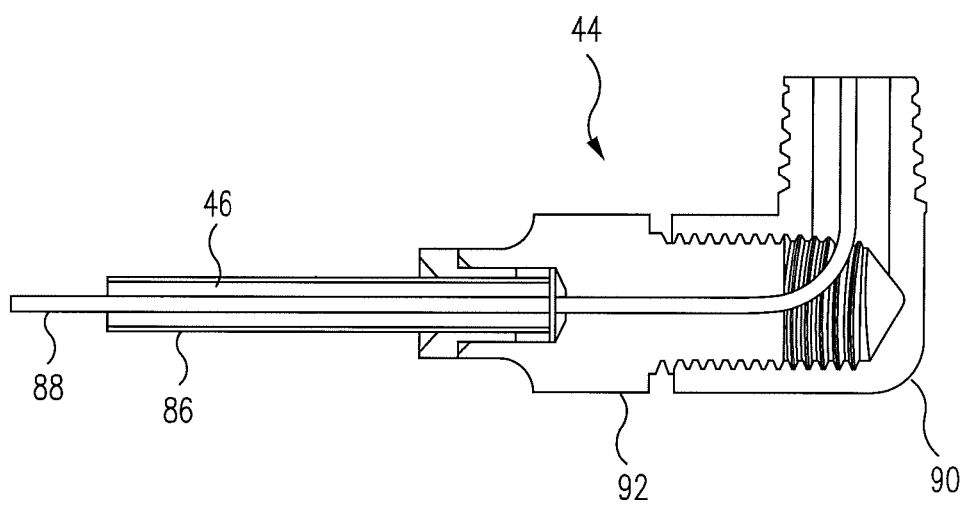
FIG. 15 is a cross-sectional view of an improved elbow fitting used in the high speed, handheld power drill of the present disclosure.

FIG. 14 is a cross-sectional view of a coolant fluid and pressure fitting 140 of the prior art drill 100 of FIG. 1, and FIG. 15 is a cross-sectional view of an improved right-angle or elbow fitting 44 used in the improved high speed, handheld power drill 10 of the present disclosure. As may be seen in both figures, the respective conduits 122 and 46 that may be used to convey a mixture of coolant fluid and compressed air from the respective coolant fluid reservoirs 126 and 36 to the respective drill bits are both coaxial arrangements, comprising an outer conduit 148, 86 disposed concentrically about a respective smaller inner conduit 150, 88. Compressed air may be conveyed in the respective outer conduits 148 and 86, and the coolant fluid may be conveyed in the respective inner conduits 150 and 88.

As may be seen in the conventional right angle fitting 140 of FIG. 14, if an attempt is made to use a standard 90 degree elbow fitting 152 with the coaxial conduit 122, the inner coolant conduit 150 cannot be made to extend through the 90 degree bend of the fitting without kinking. Accordingly, as discussed above, the conventional drill 100 may use a straight fitting that may result in the coolant delivery conduit 122 extending out radially from the coolant-air mixture valve 120, making it susceptible to being easily linked and damaged when the operator lays the drill 100 on a table or work bench.

However, as illustrated in FIG. 15, it has been discovered that, if a standard short 90 degree elbow adapter 90 is used in conjunction with a standard straight adapter fitting 92, the inner conduit 88 conveying the coolant fluid may be easily directed through the 90 degree bend of the adapter, thereby enabling the conduit 46 to exit the fluid metering reservoir 36 at a right angle without bending. As discussed above, this simple improvement may eliminate any interference between the conduit 46 and the operator's hand, and additionally, may prevent the conduit 46 from being linked or damaged when the drill 10 may be laid on a table or work bench.

Another feature of the improved power drill 10 of the present disclosure, viz., an enhanced drill bit 26, is illustrated in the enlarged cross-sectional views of the vacuum pickup and coolant fluid delivery tool 34 of FIGS. 16 and 17. In particular, a conventional drill bit 26 may incorporates a helical flute 27 having an axial length $L_f$ of about 3 inches. As described above in connection with FIGS. 8 and 9, during a normal drilling operation, as the cutting end 94 of the drill bit 26 cuts into the work piece axially, the cuttings, coolant fluid and other cutting debris 96 of the operation may be carried by the flute 27 out to the elongated slot 62 in the drill guide 32 in the manner of an Archimedes screw. The vacuum generated at the outlet end of the vacuum outlet 74 may draw ambient air through the vent holes 66 in the annular body 60 of the tool 34 in the direction of the arrows 75, which may entrain the cutting debris 95 and carry it out of the slot 62, away from the drill bit 26 and into a catch bag 80 or a remote waste container.

However, as illustrated in FIG. 16, when drilling into work pieces having a relatively large material thickness $L_m$, when the drill bit 26 cuts so deeply into the work piece that the inner end of the flute 27 is disposed distally of the elongated slot 62, the cutting debris 95 may no longer be carried away from the bit, and as a consequence, may build up and clog the annulus between the bit and the drill guide lumen 71 at the inner end of the flute. As a result, heat may build up quickly inside the lumen 71 of the drill guide 32 and may freeze the bit 26 against further rotation therein.

As illustrated in FIG. 17, it has been discovered that this problem may be eliminated by increasing the length $L_f$ of the flute 27 of the drill bit 26 to approximately 4 inches. As illustrated in FIG. 17, when the bit 26 with the enhanced flute length is used to drill a hole in material having the same thickness $L_m$ as that in FIG. 16, the cutting debris 95 may be continually carried by the extended flute to the elongated slot 62 of the drill guide 32 in the normal manner, as described above, such that clogging of the bit and drill guide may be eliminated.

Figure 18:
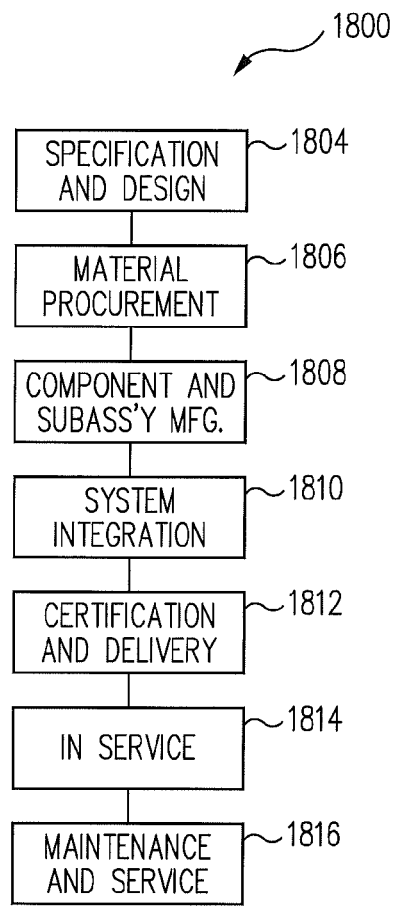
FIG. 18 is a flow diagram of aircraft production and service methodology.
Figure 19:
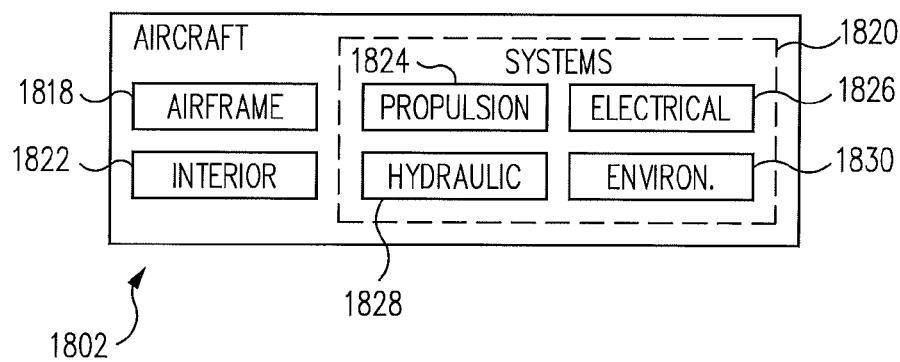
FIG. 19 is a block diagram of an aircraft.

Referring more particularly to the drawings, embodiments of the improved drill 10 of the disclosure may be utilized in the context of an aircraft manufacturing and service method 1800 as shown in FIG. 18 and an aircraft 1802 as shown in FIG. 19. During pre-production, exemplary method 1800 may include specification and design 1804 of the aircraft 1802 and material procurement 1806. During production, component and subassembly manufacturing 1808 and system integration 1810 of the aircraft 1802 takes place. Thereafter, the aircraft 1802 may go through certification and delivery 1812 in order to be placed in service 1814. While in service by a customer, the aircraft 1802 is scheduled for routine maintenance and service 1816 (which may also include modification, reconfiguration, refurbishment, and so on).

Each of the processes of method 1800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As illustrated in FIG. 19, the aircraft 1802 produced by exemplary method 1800 may include an airframe 1818 with a plurality of systems 1820 and an interior 1822. Examples of highlevel systems 1820 include one or more of a propulsion system 1824, an electrical system 1826, a hydraulic system 1828, and an environmental system 1830. Any number of other systems may be included. Although an aerospace example is shown, the principles of the invention may be applied to other industries, such as the automotive industry.

Apparatus and methods embodied herein may be employed during any one or more of the stages of the production and service method 1800. For example, components or subassemblies corresponding to production process 1808 may be fabricated or manufactured in a manner similar to components or subassemblies produced while the aircraft 1802 is in service. Also, one or more apparatus embodiments, method embodiments, or a combination thereof may be utilized during the production stages 1808 and 1810, for example, by substantially expediting assembly of or reducing the cost of an aircraft 1802. Similarly, one or more of apparatus embodiments, method embodiments, or a combination thereof may be utilized while the aircraft 1802 is in service, for example and without limitation, to maintenance and service 1816.

Figure 20:
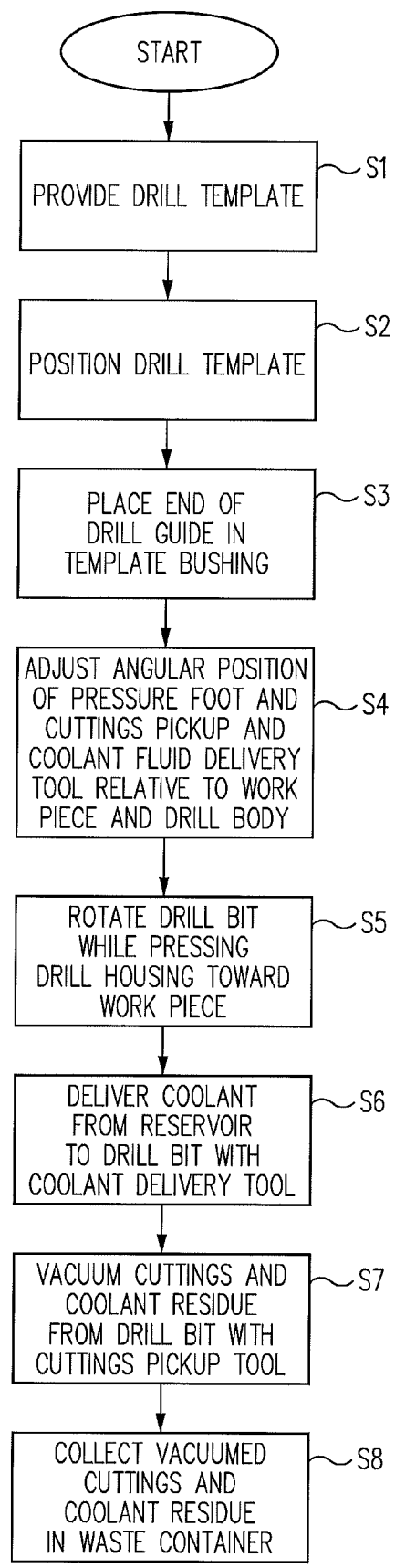
FIG. 20 is a process flow chart of an exemplary method of using the novel drill.

FIG. 20 is a process flow chart of an exemplary method 2000 of using the novel drill 10 to drill a hole in a work piece. As illustrated in FIG. 20, the method begins at S1 with the provision of a drill template having a guide hole with a guide bushing disposed therein, such as those illustrated in FIGS. 5, 8 and 9. At S2, the drill template is positioned over the work piece at a selected position thereon. At S3, an outer end of the drill guide is placed into a selected guide bushing of the drill template. At S4, the drill bit is driven rotationally with the drill motor while the operator presses the drill housing toward the work piece, such that a cutting end of the drill bit cuts a hole in the work piece. At S5, coolant fluid from the coolant fluid reservoir is delivered to the drill bit with the cuttings pickup and coolant fluid delivery tool while drilling progresses. At S6, cuttings and coolant fluid and vapor from the drill bit are vacuumed away from the drill bit with the cuttings pickup and coolant fluid delivery tool during drilling. At S7, the cuttings and coolant fluid and vapor vacuumed away from the drill bit are collected in a container while the drilling progresses.

As those of skill in this art will appreciate, many modifications, substitutions and variations can be made in the applications and methods of implementation of the high-speed, hand-held power drill system of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. A high speed handheld power drill, comprising:
   a drill motor disposed within a drill motor housing;
   a front housing removably coupled to a front end of the drill motor housing;
   a drill bit rotatably driven by the drill motor about a long axis thereof;
   a pressure foot rotatably mounted on a front end of the front housing and disposed coaxially about the drill bit;
   a drill guide extending into a front end of the pressure foot and spring biased for coaxial sliding movement between the drill bit and the pressure foot;
   means for rotating the pressure foot about the long axis of the drill bit and through a plurality of selectable angular positions relative to the drill motor housing; and
   an integrated vacuum cuttings pickup and coolant fluid delivery tool coupled to the drill guide forwardly of the front end of the pressure foot and arranged to deliver a liquid coolant to the drill bit and to remove drill cuttings and coolant fluid vapor therefrom during drilling.

2. The power drill of claim 1, wherein the rotating means comprises:
   an inner end of the pressure foot being rotatably disposed in the drill motor housing; and,
   a mechanism for locking the pressure foot at selected angular orientations thereof relative to the drill motor housing.

3. The power drill of claim 2, wherein the locking mechanism comprises:
   a plurality of locking indentations disposed circumferentially about an outer surface of the inner end portion of the pressure foot; and,
   a plurality of radially biased locking balls disposed in the drill motor housing, each arranged to engage a respective one of the locking indentations of the pressure foot at selected angular orientations thereof relative to the drill motor housing.

4. The power drill of claim 1, wherein the drill guide includes an elongated axial slot extending therethrough and in fluid communication with the drill bit, and wherein the cuttings pickup and coolant fluid delivery tool comprises:
   an annular body disposed concentrically about the drill guide and in fluid communication with the drill guide slot, the body having a plurality of radial vent holes extending there-through and in fluid communication with the drill guide slot;
   a coolant fluid inlet extending into the body and having an inner end in fluid communication with a nozzle defined by the drill guide and arranged to direct pressurized coolant fluid through the nozzle and onto the drill bit during drilling; and,
   a vacuum outlet extending out from the body and disposed in fluid communication with the drill guide slot.

5. The power drill of claim 4, wherein an axis of at least one of the coolant fluid inlet and the vacuum outlet forms an acute angle with an axis of the cuttings pickup and coolant fluid delivery tool body.

6. The power drill of claim 4, further comprising:
   means for delivering compressed air from the drill and into the vacuum outlet such that a vacuum is created at the drill guide slot during drilling; and,
   a collection bag coupled to an outlet end of the vacuum outlet and adapted to catch drill cuttings and coolant fluid vapor sucked from the drill guide slot by the vacuum.

7. The power drill of claim 4, further comprising means for coupling a remote vacuum source to an outer end of the vacuum outlet during drilling.

8. The power drill of claim 4, further comprising:
   a coolant fluid reservoir coupled to the drill motor housing and adapted to deliver coolant fluid from the reservoir to the coolant fluid inlet of the cuttings pickup and coolant delivery tool during drilling; and,
   means for adjustably metering the amount of coolant fluid delivered from the coolant fluid reservoir to the coolant fluid inlet during drilling.

9. The power drill of claim 8, further comprising an elbow fitting extending through a right angle and having an inner conduit adapted to convey the coolant fluid to the coolant fluid inlet and disposed concentrically within an outer tube adapted to convey compressed air to the coolant fluid inlet.

10. The power drill of claim 1, wherein the drill motor is driven by compressed air.

11. The power drill of claim 1, wherein the housing comprises a pistol grip and further comprising a motor actuating trigger disposed on the pistol grip.

12. A method for drilling a hole in a work piece, the method comprising utilizing the power drill of claim 1.

13. The method of claim 12, further comprising adjusting the angular position of the pressure foot relative to the work piece without changing the angular position of the housing relative to the work piece.

14. A high speed handheld power drill, comprising:
a housing having a motor disposed therein;
a chuck disposed in the housing and rotationally driven by the motor;
an elongated drill bit having an inner end coupled in the chuck for rotation about a long axis of the bit;
an elongated pressure foot mounted on a front end of the housing for coaxial rotation about the drill bit and through a plurality of selectable angular positions relative to the housing;
a drill guide slidably disposed within the pressure foot at a front end thereof and biased for coaxial sliding movement between the drill bit and the pressure foot;
a vacuum cuttings pickup and coolant fluid delivery tool coupled to the drill guide forwardly of the front end of the pressure foot and arranged to deliver a liquid coolant to the drill bit and to remove drill cuttings and coolant fluid vapor therefrom during drilling; and,
a coolant fluid reservoir coupled to the drill motor housing and adapted to deliver selectably metered, amounts of pressurized coolant fluid to the cuttings pickup and coolant delivery tool during drilling.

15. The power drill of claim 14, further comprising
means for locking the pressure foot at a selected angular position relative to the drill motor housing.

16. The power drill of claim 14, wherein the cuttings pickup and coolant fluid delivery tool comprises:
an annular body disposed concentrically about the drill guide and in fluid communication with a slot in the drill guide, the body having a plurality of radial vent holes extending therethrough and in fluid communication with the drill guide slot;
a coolant fluid inlet extending into the annular body and in fluid communication with a nozzle disposed at an inner end thereof, the nozzle being arranged to direct pressurized coolant fluid onto the drill bit during drilling; and,
a vacuum outlet extending out from the annular body and disposed in fluid communication with the drill guide slot.

17. The power drill of claim 16, further comprising:
means for delivering metered amounts of pressurized coolant fluid from the coolant fluid reservoir to the coolant fluid inlet of the cuttings pickup and coolant fluid delivery tool during drilling;
means for creating a vacuum at an outer end of the vacuum outlet of the cuttings pickup and coolant fluid delivery tool during drilling; and,
means coupled to the outlet end of the vacuum outlet for catching drill cuttings and coolant fluid and vapor sucked from the drill guide slot by the vacuum during drilling.

18. A method for drilling a hole in a work piece using the power drill of claim 17, the method comprising:
providing a drill template having a guide hole with a guide bushing disposed therein;
positioning the drill template over the work piece at a selected position thereon;
placing an outer end of the drill guide into the guide bushing of the drill template;
driving the drill bit rotationally with the motor while pressing the drill housing toward the work piece, such that a cutting end of the drill bit cuts a hole in the work piece;
delivering coolant fluid from the coolant fluid reservoir to the drill bit with the cuttings pickup and coolant fluid delivery tool during the drilling;
vacuuming cuttings and coolant fluid and vapor from the drill bit with the cuttings pickup and coolant fluid delivery tool during the drilling; and,
collecting the cuttings and coolant fluid and vapor vacuumed from the drill bit in a container during the drilling.

19. The method of claim 18, further comprising adjusting the angular position of the pressure foot and cuttings pickup and coolant fluid delivery tool relative to the work piece without changing the angular position of the housing relative to the work piece.

* * * * *